Aug. 16, 1932.     F. J. BOLEN     1,872,106
TRACTOR HITCH
Original Filed Oct. 4, 1930     4 Sheets-Sheet 3
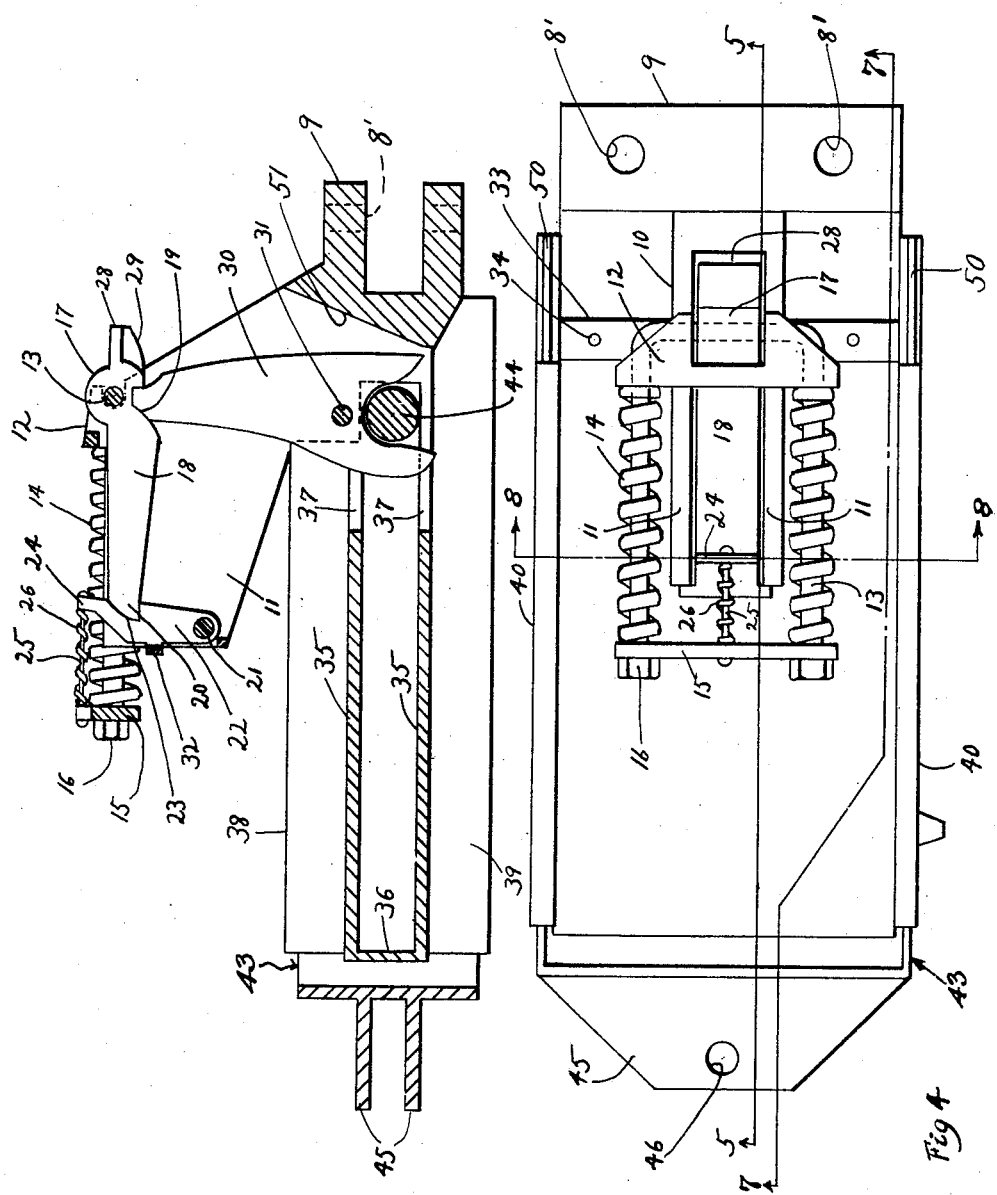
Inventor
Frank J. Bolen
By Clarence A O'Brien
Attorney Aug. 16, 1932.  F. J. BOLEN  1,872,106
TRACTOR HITCH
Original Filed Oct. 4, 1930  4 Sheets—Sheet 4
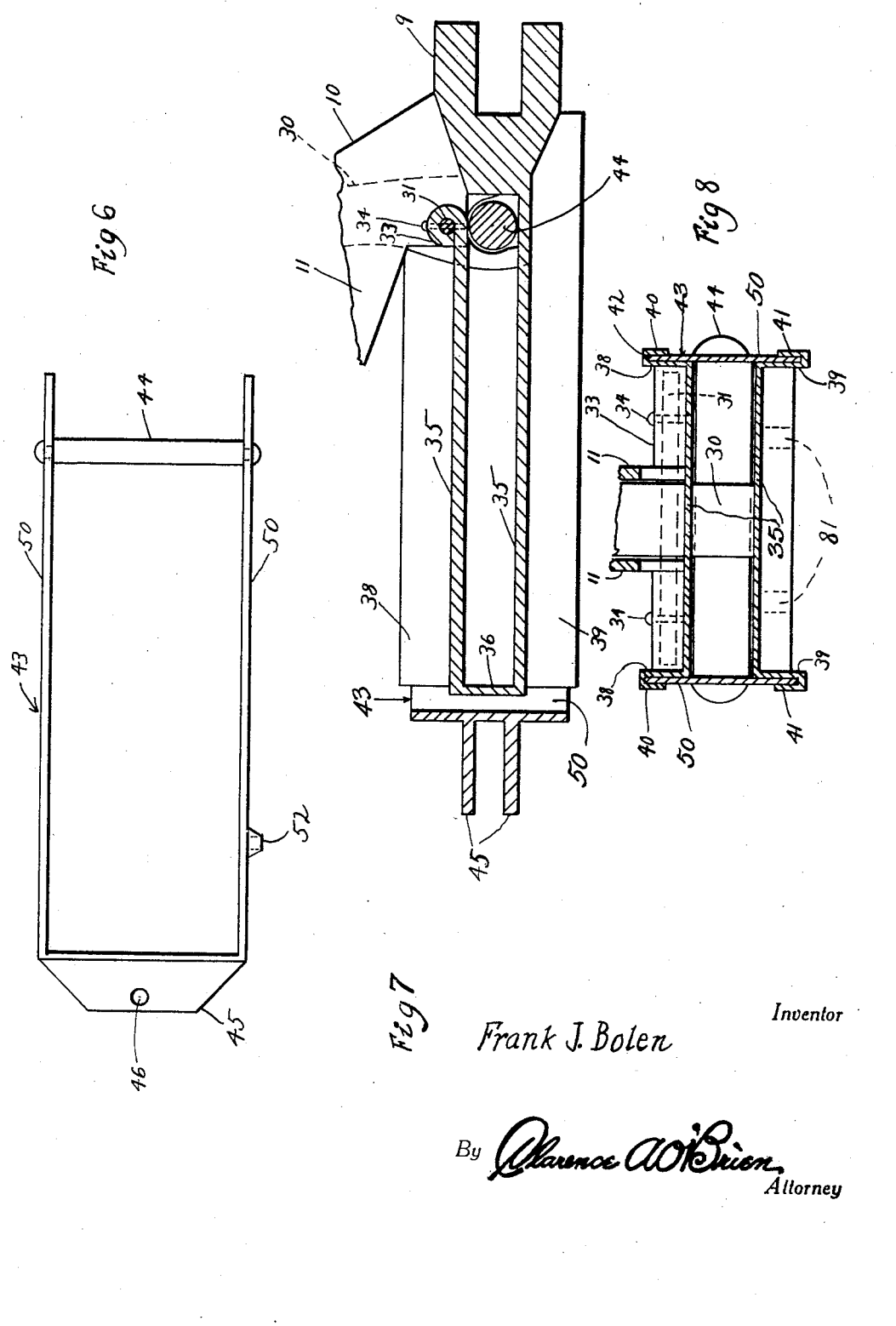
Inventor
Frank J. Bolen
By Clarence A. O'Brien
Attorney Patented Aug. 16, 1932

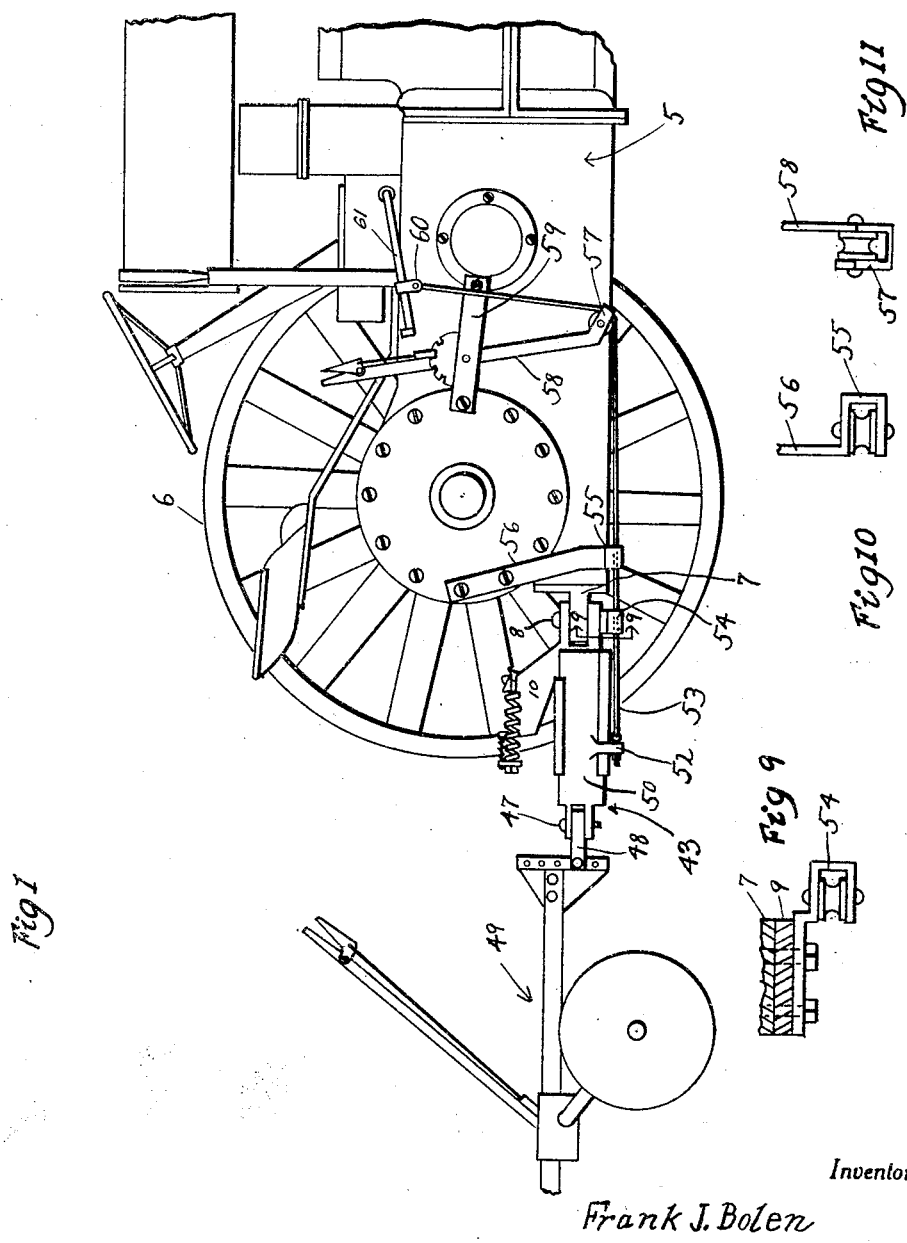

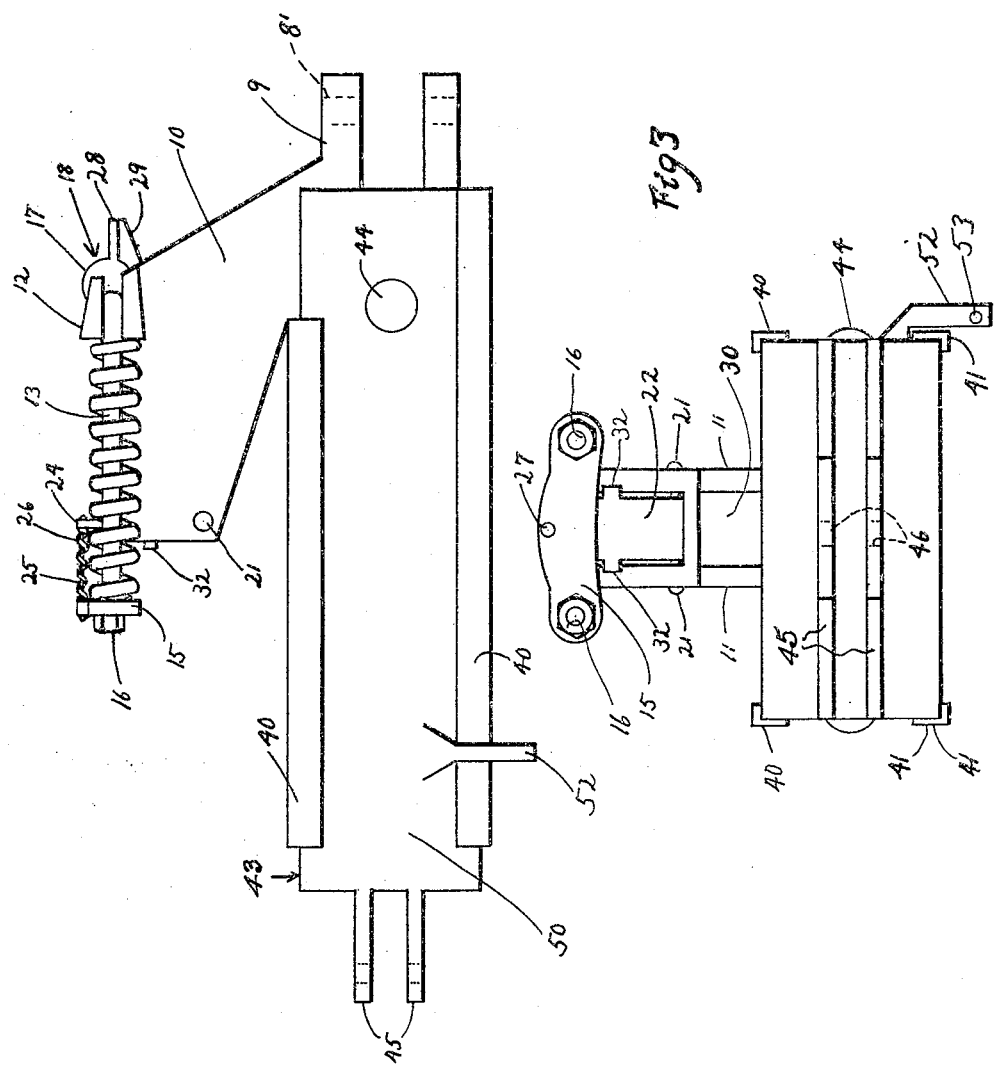

1,872,106

UNITED STATES PATENT OFFICE

FRANK J. BOLEN, OF VAN HOOK, NORTH DAKOTA

TRACTOR HITCH

Application filed October 4, 1930, Serial No. 486,441. Renewed April 2, 1932.

This invention relates generally to tractor hitches, and particularly to an arrangement for incorporation in or as an attachment to a safety release spring hitch, whereby the coupling of the tractor and the drawn machinery is facilitated whenever the hitch has been released by the encountering of obstacles in the ground.

It is an object of this invention to provide a device of this kind which is capable of being incorporated in and formed as a part of standard make safety release spring hitches, and it is therefore, not my intention to claim as my invention the parts referred to herein, which are well known already in the art, but it is my intention to claim the useful co-operation which my improvement thereon affords.

Ordinarily when a drawn plow hits a tight rock or stump the safety release spring hitch will let the plow loose from the tractor, that is, uncouple the same, and the plow clevis will fall upon the ground and the tractor will run ahead fifteen or twenty feet before the operator thereof can stop it. In order to recouple the tractor with the drawn plow or the like, the operator must shift gears and reverse the tractor to a point near the plow, then get down from the tractor and raise the plow clevis from the ground and fasten it to the spring hitch hook providing the operator has backed the tractor into the exactly right position, though the usual thing is that the tractor will be found to have been placed a trifle too much ahead or a trifle too much to the rear, upon which circumstances the operator will then remount the tractor and again shift gears and attempt to achieve the proper position which he may fail to do several times before he gets it just right. This condition of things also involves the trip ropes for the plow, and it is obvious that it is very inconvenient to properly handle the said trip ropes when the tractor and the drawn plow separate in this manner. It is accordingly an object of this invention to eliminate the difficulties stated above by providing a mechanism which will permit the separation of the drawn plow from the tractor as in the first instance, but will prevent the separation of the tractor and the plow more than a distance of a few inches. The invention provides that the coupling of the tractor and the plow is accomplished simply by backing the tractor the few inches necessary, upon which movement the recoupling is automatically accomplished. The device provides for automatically releasing the clutch and hence stopping the tractor immediately upon the separation of the tractor and the plow when the plow strikes an obstruction in the ground.

These and other objects and advantages which will be more clearly perceived as the description proceeds, the nature of the invention, its composition and arrangement and combination of parts will be readily understood by anyone acquainted with the art to which this invention relates upon consulting the following descriptions and the drawings, in which:—

Figure 1 is a general elevational view from one side of a tractor with the rear wheel removed to more clearly disclose the arrangement of the parts of my invention, the tractor being shown hitched to a drawn plow or the like.

Figure 2 is a side elevational view of my improved hitch.

Figure 3 is an end view of Figure 2 taken from the left.

Figure 4 is a top view of Figure 2.

Figure 5 is a vertical longitudinal section taken approximately on the line 5—5 of Figure 4.

Figure 6 is a top view of the main sliding clevis.

Figure 7 is a vertical longitudinal sectional view through Figure 4 approximately on the line 7—7.

Figure 8 is a transverse vertical sectional view through Figure 4 approximately on the line 8—8.

Figure 9 is a partial vertical transverse sectional detail view on the line 9—9 of Figure 1 disclosing the method of attachment of the rear release cable guide.

Figure 10 is a detail view of the lower end of the guide bracket.

Figure 11 is a detail view of the lower end of the hand clutch release lever.

It is to be definitely understood that I do not desire to limit the application of this invention to the particular modification set forth herein to illustrate the same and the principles upon which it relies, but any change or changes may be made in material, structure or arrangement of parts consistent with the spirit and scope of the invention or capable of adapting the same.

While I describe and illustrate herein the employment of my invention in connection with an upright safety release spring hitch, the invention is equally applicable to different types of hitches and especially to the horizontal type of safety release spring hitch well known in the art.

Referring in detail to the drawings the numeral 5 designates generally the body of a tractor and 6 the rear traction wheels and the numeral 7 the tractor draw bar and the numeral 8 one of the attaching bolts for securing to said draw bar the front clevis 9 of the spring release hitch. The construction of the spring release hitch is well known in the art, and comprises an upwardly and rearwardly projecting body 10 which is composed of a pair of side plates 11 open at the rear end. The forward end of the body 10 is closed and slopes downwardly and forwardly to merge with the rear portion of the upper member of the front clevis 9. Secured on the upper front part of the body 10 is a cross member 12 in the form of a triangular block which has its forward and side portions grooved to accommodate the bight portion of a U-shaped bar 13 which extends its legs rearwardly and on each side of the plates 11. On each of the legs is a coiled spring 14 which is maintained at the front ends thereof by the block 12 and at the rear ends by a cross member 15 which is secured in place by a nut 16 turned on the ends of the legs of the U-shaped bar. The front edge of the block 12 is cut away to accommodate a humped portion 17 of a normally horizontal lever 18 which is pivoted on the bight portion of the U-shaped bar 13. Diametrically opposite from the humped portion is a notched cam formation 19, and the greatest length of the lever 18 extends rearwardly and terminates in a cam face and stop surface 20. Pivoted on a bolt 21 supported across the lower portion of the rear end of the plates 11 is a normally vertically disposed latch 22 which has a triangular notch 23 in its forward face for normally seating the cam and stop formation 20 on the lever 18. An upward projection 24 on the latch 22 supports in rearwardly directed horizontal relation a pin 25 carrying a light coil spring 26, and the pin is slidable in an aperture in the upper part of the cross member 15 which is designated 27. The forward end of the lever 18 is provided with a nose 28 having a lower curved portion 29. Normally vertical and having its upper end engaged in the cam formation 19 of the lever 18 is a fish-tail lever 30 pivoted near its lower end on a pivot 31 in the lower portion of the body 10. It should be stated that the latch 22 has a pair of laterally extending ears 32 on its back and projecting outwardly for engagement against the forward edges of the plates 11, to prevent the said latch from falling forward. The laterally extending portions of the pivot 31 are rotatably embedded in a tunnel or bearing 33 and it is maintained against turning therein and lateral displacement by pins or keys 34 projected diametrically through the said tunnel and the pivot 31. The bearing 33 is formed integrally with a longitudinally extending body generally designated 43 which is formed integral with and extends rearwardly from the lower part of the body 10. The body 43 comprises a pair of vertically spaced parallel plates 35 having a cross member 36 extending between and closing the interval between the said plates at the rear end thereof, and the forward portions of the plates 35 are cut away as at 37 centrally thereof to accommodate the swinging of the lower part of the fish-tail lever 30 which will be subsequently described. Extending longitudinally the length of the plates 35 are vertical flanges 38 and 39, the flanges 38 extending upwardly from the outer edge of the upper plate 35 and the flanges 39 extending downwardly also at right angles from the outer edges of the lower plate 35. By this construction the plates 35 are held in spaced relation. Formed on the outer longitudinal edges of the flanges 38 and 39 and more clearly shown in Figure 8 are downwardly turned portions 40 and upwardly turned portions 41 which form channels 42 to receive elements to be described. Referring to Figure 6 there will be seen a U-shaped structure generally designated 43. This structure 43 embodies draw pin 44 fixed across the legs thereof somewhat within the ends of the legs and securely fastened thereto. The bight portion of the structure 43 carries a pair of vertically spaced plates 45 forming a clevis and provided in each with a bolt receiving hole 46, for accommodating a coupling pin 47 for retaining pivotally a coupling link 48 for attaching to the drawn plow or the like generally designated 49 in Figure 1. The legs 50 of the structure 43 are formed of vertically disposed and longitudinally extended plates and which fit between the slide in the channel 42 formed on the plates 38 on each side of the body generally designated 34. Obviously, this disposition of the structure 43 places the draw bar 44 in the space between the plates 35 in slidable relation. Normally the fish tail lever 30 engages the draw pin 44 as illustrated in Figure 5. When the traction force on the clevis 45 exceeds the normal, such as when the plow or the like strikes a considerable obstruction in the ground, the draw pin of the structure 43 moves rearwardly against the tension of the spring 14. This above normal pull on the slidable clevis structure 43 is communicated to the spring 14 through the consequent forward turning of the lever 30 whose upper end engages the cam arrangement 19 on the lower side of the lever 18, resulting in drawing the lever 18 and the U-shaped bar on which it is pivoted forwardly, and contracting the spring 14 obviously. The clevis structure 43 continues rearwardly until finally the portion 20 at the rear end of the lever 18 drops out of the notch 23, which then disengages the upper end of the fish tail lever 30 from the cam arrangement 19, thus freeing the draw bar 44 and permitting the clevis structure 43 to be drawn rearwardly until the said draw bar 44 strikes the end plate 36. When this has been accomplished, all that is necessary to do in order to recouple the clevis structure 43, is to back up the tractor, so that the draw pin 44 advances and strikes between the fish tail portions of the lever 30, and restores the lever 30 which has been resting against the shoulder 51, to vertical position as illustrated in Figure 5, which action of the lever 30 will result in striking the cam arrangement 19 on the lever 18 which will restore the lever 18 into horizontal position and cause the latching of the portion 20 of the lever 18 in the notch 23 against the tension of the spring 26 thus latching the mechanism once more. The tension of the spring 14 is such as to maintain the mechanism in latched position under ordinary or normal loads.

The mechanism for stopping the tractor by means of throwing out the clutch thereof comprises the following elements: An outwardly and downwardly projected bracket 52 on one of the side plates 50 near the rear end thereof which is connected to a cable 53 which runs forwardly into a guide pulley bracket 54 attached to extend on the same side from the underpart of the clevis 9 as illustrated in Figures 1 and 9, and the cable is then diverted laterally to be threaded through another guide pulley bracket 55 on the lower end of a guide bracket member 56 which is secured to a portion of the differential housing of the tractor and extends downwardly and laterally therefrom, and the cable 50 continues forwardly to be threaded through guide pulley bracket 57 on the lower end of a hand operated lever 58 which is mounted adjacent the forward part of the driver's seat by means of a support 59 bolted as shown in Figure 1 to adjacent portions of the tractor body 5, on which support member is mounted a ratchet in cooperation with the ratchet engaging means on the hand lever, and the cable 53 is then upwardly extended to be fastened to a clamp 60 which is clamped about the clutch pedal lever 61. The cable 53 is so adjusted and tensioned that when the clevis structure 43 is released and moves rearwardly, the clutch pedal 61 is drawn downwardly and the clutch of the tractor released. This results in the almost immediate stopping of the tractor. The lever 58 is ordinarily positioned drawn backward for properly tensioning the cable 53, but for the purposes of recoupling the hitch it is thrown forward so as to slacken the cable 53 and to release upwardly the clutch pedal lever 61 for engaging the clutch and starting the tractor when it is desired to move the tractor forward once again.

It will now be obvious that the hitch having been released and the tractor stopped by the means described above, that the simple backing of the tractor accompanied by the forward motion of the lever 58 will result in the reengagement of the hitch and when this has taken place it will permit immediate proceeding of the tractor. Thus it is obvious that a very great saving of time and labor is brought about by the use of my invention, and the operations necessary without the use of my invention as set out in the first part of the specification compared to the simple and easy operation just described, will fittingly disclose the practical advantages resident in the use and employment of my invention.

It should be noted that the tractor member 56 and the support member 59 for the lever ratchet mechanism are so supported and formed that they may be attached to the structure of the tractor by the bolts already in place thereon, thus obviating the necessity of alterations and changes in the structure or addition of other structures for attachment to the tractor in order to mount the said members, thus resulting in a saving of expensive labor and material, and contributing to the compactness and effectiveness of the invention.

What is claimed is:—

1. A tractor hitch of the type described comprising a conventional safety spring release hitch mechanism for tractors and a rearward extension thereon comprising a pair of vertically and parallelly spaced plates, each of said plates having a pair of flanges carrying channel formations at their edges, and a member slidable in said channels and having a cross bar slidable between said plates and a draft clevis on its rear end, a wall bridging the rear ends of the plates and functioning as a limit stop for said cross bar, said plates having a cut out portion centrally at their forward end, a lever having a fish tail formation normally riding on said cross bar and having its lower end operatively received in said cut-out portion, said lever adapted to operate the said safety spring release mechanism, and a projection on one side of the slidable member, a cable having one end attached to said projection, and a series of roller guides mounted on the hitch and on the tractor body for conveying the cable forward, a lever having a ratchet mechanism and for adjusting the tension of the cable, and the upper end of the cable clamped to the clutch release pedal of the tractor, for automatically releasing the clutch of the tractor upon the release of the safety spring release hitch mechanism.

2. A tractor hitch of the type described comprising conventional safety spring release mechanism consisting of a body formed of a pair of longitudinally extending parallel spaced plates mounted at their forward ends to a forward clevis body attached to a tractor draw bar, a spring positioned latch member of limited forwarded swing mounted between the outer rear ends of the plates, a lockable normally horizontal lever pivoted between the forward ends of the plates, a U-shaped bar having rearwardly directed legs and a bight portion acting as a pivot for said lockable lever, compressible springs on said legs, and a fish tail lever pivoted between the plates at their inner portions, the outer end of said fish tail lever adapted to engage the shoulders of a notch in the near side of the lockable lever, and the rearward end of the lockable lever adapted to be engaged by the latch member; and a pair of parallel spaced plates extending rearwardly from the release mechanism body having a limit stop bridging their rearward ends, and a slide carrying on its rear portion a clevis for pivotally carrying a draft coupling, and at its forward end a cross bar, said slide mounted slidably on said rearwardly extending plates with the said cross bar slidably between said plates and normally engaged by the tail portion of the fish tail lever for operating the safety spring release mechanism, and means connecting the slide with the clutch release pedal of the tractor for releasing the clutch as a result of the rearward movement of the slide upon its being released by said mechanism.

In testimony whereof I affix my signature.

FRANK J. BOLEN.